United States Patent Office 2,838,604
Patented June 10, 1958

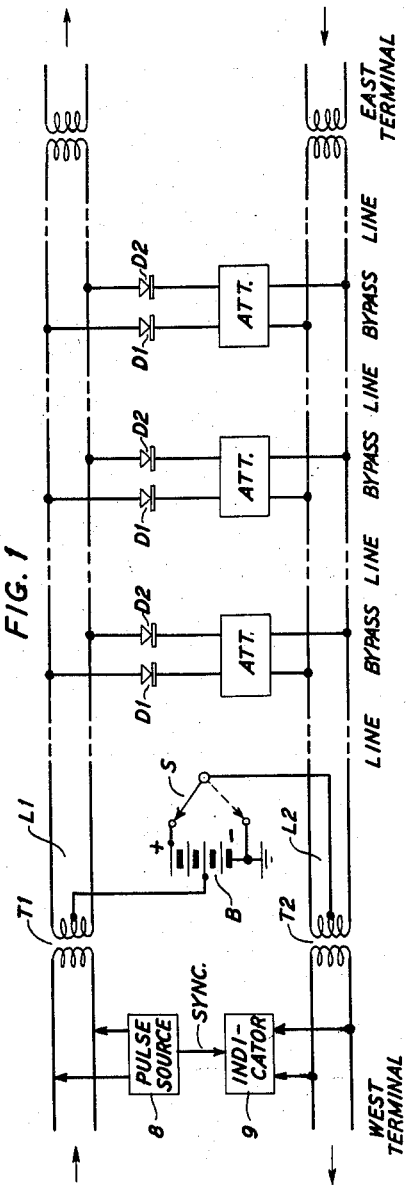
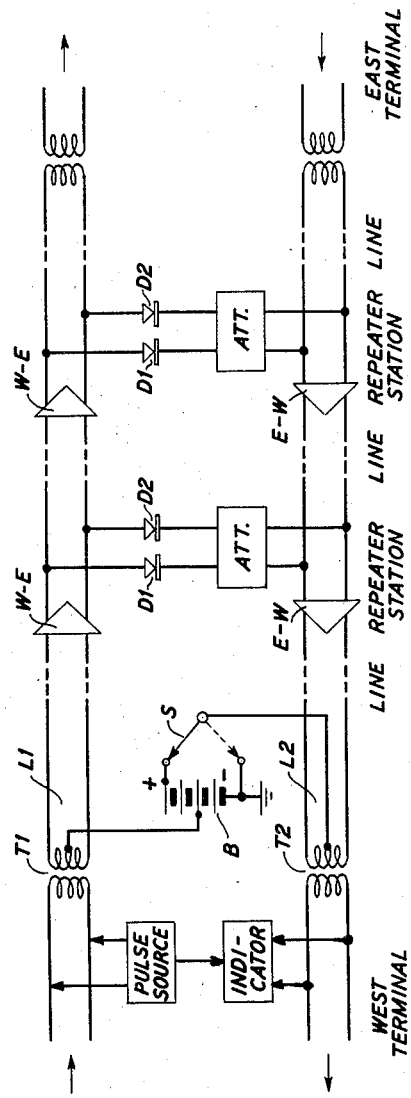

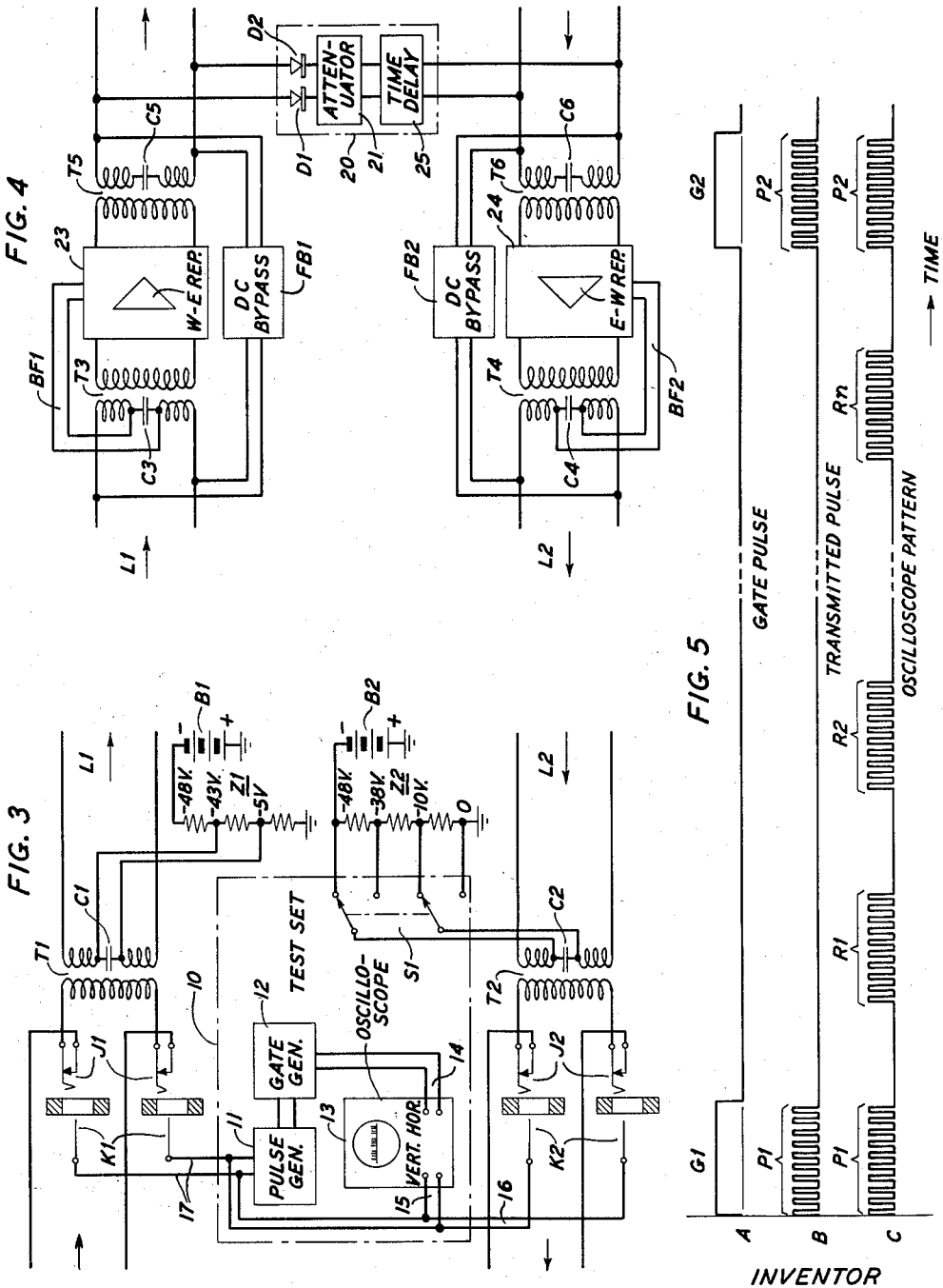

---

2,838,604

ELECTRIC FAULT LOCATION

Daniel F. Hoth, Summit, N. J., assignor to Bell Telephone Laboratories, Incorporated, New York, N. Y., a corporation of New York Application March 5, 1956, Serial No. 569,626

17 Claims. (Cl. 178—69)

---

This invention relates, in general, to fault-location apparatus in communications systems and, more specifically, to the location of faulty repeaters in two-way transmission systems.

Various systems and devices have been developed for the location of faults, such as grounds and open circuits, on electric transmission lines by such means as impedance or pulse echo methods. The method employing impedance measurements requires extensive calculations to determine the distance to the fault, and the pulse echo measurement method requires accurate and complex timing circuits.

Accordingly, one object of the present invention is to simplify the location of faults in communication systems.

Another object is to sectionalize a two-way transmission system in order that faulty sections may be quickly located.

A further object is to expedite the remote location of faults in a two-way transmission system.

A more particular object is to identify quickly and by a simple means a faulty repeater in a repeatered transmission system.

These and other objects are achieved in an illustrative embodiment of the invention described in more detail below in which a faulty repeater in a two-way repeatered transmission system is quickly identified by simple tests conducted at one terminal of the system. First, a metallic by-pass is established between the oppositely directed lines at each repeater station. Next, sharp pulses at a predetermined repetition rate are applied to one pair of lines directed away from the test terminal. The pulses transmitted down the line are conducted through the by-passes at each repeater station and returned to the test terminal over the other line to be observed on an indicating device, such as an oscilloscope.

The transmitted pulses are so timed that a separate pulse is received from each repeater station. When all repeaters in the system are operating satisfactorily, a separate pulse will be received from each repeater station. When, however, a faulty repeater is present, either no pulse or a mutilated pulse will be received from points beyond the faulty repeater. Thus, it is possible to determine which repeater is faulty and, since the location of each repeater is known, no calculations or precision timing circuits in the oscilloscope are required.

In the preferred embodiment to be described, the by-passes comprise semiconductor diodes which are normally in their high resistance condition so as not to interfere with normal transmission over the lines, but which are switched to a low resistance condition when a test is to be conducted by means of a bias supplied to the lines from the test terminal.

One feature of this invention is the elimination of laborious calculations and precise timing circuits for determining the distance from the test terminal to a fault location in a transmission system.

Another feature of the invention is that the location of the fault can be accomplished from one terminal of the transmission system.

A further feature of the invention is the achievement of the above and other objects by the use of standard items of pulse generating and indicating equipment.

As will become more apparent below, the invention is particularly suited for use on repeatered transmission lines where the by-passes are located at the repeater stations, since repeater stations are generally unattended and are often located in relatively inaccessible places such as in manholes or on poles. The invention is not, however, limited to either repeatered or cable systems, but is applicable to transmission systems generally. In any case, a convenient means is provided for quickly locating a fault remotely from a terminal station or other accessible point so that maintenance crews can be dispatched directly to the fault location. Interruptions in service and the time required for the repair of the fault are thus reduced to a minimum.

For a better understanding of the invention together with other and further objects, advantages, and features, reference is made to the following drawings and description, in which:

Fig. 1 is a simplified representation of a four-wire transmission line sectionalized by by-passes in accordance with the invention;

Fig. 2 is a simplified representation of a four-wire transmission line including repeater stations equipped with by-passes in accordance with the invention;

Fig. 3 is a block schematic diagram of one terminal of the transmission line from which tests are conducted in accordance with this invention;

Fig. 4 is a block schematic diagram of a repeater station showing by-passes in accordance with the invention; and Fig. 5 shows a pulse timing pattern to aid in gaining an understanding of the illustrated system.

Fig. 1 illustrates by simplified block schematic form an underlying principle of the invention applied to a four-wire transmission line. L1 and L2 designate the respective pairs of wires for transmitting signals from West to East and from East to West, respectively. Line L1 is normally fed through transformer T1, the secondary winding of which is center tapped. Line L2 is terminated in a similar transformer T2, the primary winding of which is center tapped. At predetermined intervals along the line, by-passes D1 and D2 are connected between wires of lines L1 and L2 to divide the lines into sections of known length. By-passes D1 and D2 may, alternatively, be switches or relays, to provide a conductive path between oppositely directed line wires. However, switches required manual operation and would thus not provide the remote actuating feature of the invention. Relays generally require an independent source of power for operation.

Semiconductive diodes, however, are well suited to this purpose. Diodes D1 and D2 may be of the silicon, germanium, or copper oxide asymmetrically conducting type in which the reverse to forward resistance ratio is 1000 to 1 or more. Vacuum tube diodes might also conceivably be employed, but would require filament power. However, the illustrative embodiment employs semiconductor diodes poled for easy conduction from the wires of line L1 to those of line L2. To activate diodes D1 and D2, a bias battery B at the terminal station is connected between the center taps on transformers T1 and T2. The center tap of transformer T1 is permanently connected to a midtap on battery B. The center tap on transformer T2, on the other hand, is connected through a single-pole single-throw switch S to either the positive or negative terminal of battery B. When switch S is at the positive terminal of battery B, the wires of L1 are at a lower potential than those of line L2 and diodes D1 and D2 are back-biased in the reverse conduction state. No transmission then occurs between line L1 and line L2. On the other hand, when switch S is at the negative terminal of battery B, line L1 is at a higher direct-current potential than line L2 and diodes D1 and D2 are forward-biased. Therefore, any signal transmitted down L1 is by-passed at each by-pass location to line L2.

Now if a pulse source, such as 8 in Fig. 1 is connected to the primary of transformer T1, pulses will be transmitted over line L1 through the various by-passes D1 and D2 and back over line L2 to the West terminal, where a receiver or indicator 9, for example, may be connected. Because of the inherent delay in transmission along lines L1 and L2, pulses are received at known discrete time intervals from each by-pass location to be analyzed. Indicator 9 may be an oscilloscope having its sweep circuit synchronized with the pulse source 8 which is adapted to transmit pulses spaced at time intervals greater than the round-trip transmission time over the line.

Because no pulse, or a mutilated pulse is returned from the section of the line in which a fault occurs it is known immediately which section is at fault. Therefore, further operations to determine the exact location of the fault may be confined to that particular section of the line, that is, the fault has been localized or sectionalized from the terminal station.

It will be obvious, of course, that the by-pass diodes as shown may effectively short-circuit the line if their forward resistance is very low. Therefore, suitable attenuators, such as the boxes marked ATT in Fig. 1, may be required in each by-pass circuit. A resistive pad, for example, having a high input and output impedance serves adequately for this purpose.

Fig. 2 is essentially the same as Fig. 1 and the operating principles are the same, with the exception that spaced repeaters illustrated merely as amplifiers E–W and W–E are provided for amplification of East-to-West and West-to-East signals, respectively. It is assumed here that repeater power is supplied locally at each repeater station. By-pass diodes D1 and D2 are located at the repeater stations and are connected from the output of the repeater in the line transmitting away from the test location to the input of the oppositely directed repeater. The bias battery connection is the same phantom arrangement shown in Fig. 1. Of course, if tests were being conducted from the East terminal instead of from the West terminal as shown, by-pass diodes D1 and D2 would be located on the opposite sides of the repeater amplifiers from that shown.

Where repeaters are used on the line, as shown in Fig. 2, attenuators, such as ATT in the by-pass circuits, are necessary to attenuate the by-passed signal to the same level as the signal normally received from repeaters on the same line to avoid overloading the E–W repeaters. In addition, it may be found necessary to provide an additional repeater or equivalent amplifier at the measuring terminal in order to establish a high enough level to operate the indicating means.

Figs. 3 and 4 show in block schematic form one illustrative embodiment of the testing system of the present invention applied to a particular two-way repeatered telephone transmission line employing pulse modulation. Fig. 3 is an elaboration of the West terminal of Fig. 2, and Fig. 4 shows in more detail the circuits of a repeater station shown in block form in Fig. 2. The particular transmission system shown uses two exchange cable pairs, one pair for each direction of transmission, between two central office terminals identified as East and West. These two terminals are located as far apart as twenty miles or more and regenerative repeaters are spaced along the cable at approximately one-mile intervals.

Each cable section is transformer coupled at each end to either a terminal or a repeater station. One side of each transformer has a split winding connected by a small capacitor, such as C1 in Fig. 3, to pass alternating current, but to block direct current. Because of this transformer arrangement, direct-current power for the operation of the repeaters may be supplied over metallic paths comprising each pair of lines from one or the other or both terminal stations without interfering with the pulse transmission. At the same time it is possible to maintain an appropriate potential difference between the respective wires of lines L1 and L2 to activate the by-pass diodes when desired.

The amplifiers used at each repeater station in this particular embodiment may be, for example, pulse regenerative transistor amplifiers of the type described in United States Patent No. 2,703,368 issued to L. R. Wrathall on March 1, 1955.

When reference is made herein to "repeater stations," it is to be understood that such a station includes separate amplifiers for each direction of transmission. Each individual amplifier will be referred to as a "repeater."

A somewhat more detailed description of the transmission system may be in order at this point before proceeding to a description of the testing system itself. It is seen from Fig. 2 that two cable pairs are required for two-way transmission between the East and West terminal stations, which may be two telephone central offices. The cable pairs may comprise 19- or 22-gauge wire. The system for each direction of transmission between terminal stations comprises one-mile line sections, terminated at each end by split-winding transformers and repeater stations such as shown in Fig. 4, together with battery feed line BF1 and battery by-pass and feedback networks FB1, joining the line sections. Each of the East-West and West-East lines is similarly constituted of a succession of line sections and repeaters.

At each repeater station, as shown in Fig. 4, is incorporated a West-East and an East-West repeater, such as 23 and 24 respectively. At each terminal station, the intelligence to be transmitted is encoded into a succession of binary pulses of standardized amplitude occurring, or failing to occur, in uniform time slots. This system is known as pulse code modulation. By time division multiplexing, several messages may be transmitted simultaneously. Pulses transmitted from the terminal stations are at a level of about 2 volts peak. In each line section an attenuation of up to 40 decibels may occur. Each of the repeaters not only restores this loss and retransmits the pulse, but also reshapes and retimes it, as is more fully described in the above-cited Wrathall patent. The retiming circuit operates on the "flywheel" principle, and requires a steady stream of pulses to maintain operation.

Direct-current power is supplied to the repeaters from the terminals over the same cable pairs as the transmitted intelligence by a method such as shown in Fig. 3 by way of example. The transformer windings (secondary of transformer T1 and primary of transformer T2 in Fig. 3) at each end of a line section are split and connected by a capacitor, such as C1 and C2, thus isolating each conductor of a cable pair from the other with respect to direct-current. At the terminal end of a cable pair, the 48-volt battery, B1 for example in the West-East line L1, has a voltage divider Z1 connected across it. One conductor of a cable pair is connected to a tap at −43 volts, for example, and the other conductor is connected at −5 volts, leaving 38 volts impressed between conductors in the cable pair constituting line section L1 to furnish repeater power.

At the repeater end of line L1, shown in Fig. 4, wires designated BF1 supply power to repeater 23, which, because of the use of transistor amplifiers, operates at a low direct-current voltage. At the same time a by-pass network FB1 connects the conductors of the line section feeding the repeater station with the corresponding conductors of the line section following repeater 23. Network FB1 and similar network FB2 associated with East-West repeater 24 contain both the resistive elements of the alternating-current feedback circuit of the Wrathall amplifier and appropriate inductor elements to form a low-pass filter passing the direct-current power around the repeaters. Succeeding repeater stations are similarly supplied with power.

The above description has been somewhat extended because the testing system of the present invention applied to repeatered transmission lines takes advantage of some of the features of the transmission system just described. In order to carry out the testing system which constitutes this invention, a by-pass arrangement, such as described above in connection with Figs. 1 and 2, must be incorporated in each repeater station as a permanent part of the installation.

A novel method of activating the by-pass by means of the same batteries supplying power to the repeaters in each line is made possible by the employment of semiconductor diode elements D1 and D2. The voltage divider Z2 across battery B2 in terminal West (Fig. 3) supplying power to the East-West line is tapped at —48, —38, —10 and 0 volts, instead of at —43 and —5 as in the West-East line. A double-pole single-throw switch S1 connects the conductors of L2 to the voltage divider Z2. By means of the switch, the conductors of line L2 may be placed at either —48 and —10 volts or —38 and 0 volts, supplying in each case the required 38 volts for operation of the repeaters. When the conductors of line L2 are at —38 and 0 volts, the conductors of line L1 are at —43 and —5 volts. This places a bias on diodes D1 and D2 of —5 volts, causing them to assume a high resistance state and practically none of the signal on line L1 is conducted to line L2. On the other hand, when switch S1 is moved to the other position, the conductors of line L1 remain as before, but the conductors of line L2 are at —48 and —10 volts. A bias of +5 volts then appears across diodes D1 and D2 placing them in their low resistance state. At this time only attenuator 21 limits the transfer of energy from line L1 to line L2, and insures that the return repeater will not be overloaded. A similar set of diodes located at each repeater station is similarly and simultaneously activated by switch S1.

The test set 10, shown in detail in Fig. 3, comprising pulse generator 11, gate generator 12, oscilloscope 13 and switch S1, may be located at one or the other of the terminal stations. Of course, due regard to the location of the by-passes at the repeater stations must be given in the choice of which terminal is to be employed as the testing location. There must also be provided at the test location means for disconnecting the terminal equipment from the repeatered lines to be tested.

For example, in Fig. 3 jacks J1 and J2 are shown on the terminal West sides of transformers T1 and T2, respectively. Mating plugs K1 and K2 are provided at the ends of the output cable 16 and input cable 17 of the test set to effect disconnection of the terminal equipment from the lines when plugs K1 and K2 are plugged into jacks J1 and J2, respectively. The output of pulse generator 11 is applied over cable 17 through plugs K1 to jack J1 and out over the transmitting line L1. The returned pulses are picked up from jacks J2 on line L2 and applied through plugs K2 and cable 16 to the vertical plates 15 of the oscilloscope 13. It is to be understood, of course, that an amplifier having the same gain as the line repeaters may be required in line 16 to produce a satisfactory pattern on the oscilloscope if the oscilloscope is not equipped with an appropriate vertical amplifier.

In the particular transmission system illustrated in Figs. 3 and 4, the one-way transmission delay time between repeaters is about 8 microseconds for a one-mile repeater station spacing. Thus the round-trip delay time for signals returning by way of the first repeater station is approximately 16 microseconds, from the next repeater about 32 microseconds, and so forth. Therefore, for a 20-mile repeatered line, about 320 microseconds delay results. In order to view the returned pulses from all the repeater stations, at least 320 microseconds must elapse between transmitted pulses. A much longer delay is, however, recommended. The transmission of a pulse might be effected every 10,000 microseconds (100 times per second), for example. The round-trip delay for each repeater station must be known in advance in order to determine, in the case of a faulted repeater station, exactly which repeater station is affected.

There is another factor to be considered where regenerative repeaters are employed on the line. The Wrathall repeater, for example, includes a retiming circuit comprising a shock-excited ringing oscillator to produce the timing wave. In order to maintain the timing wave generator in proper synchronism, a relatively continuous train of impulses from the incoming line is required. For this reason a single pulse transmitted at intervals that would be quite satisfactory for a nonrepeatered line or a line having linear nonregenerative repeaters may probably not be repeated reliably into the output circuit of each repeater. In addition, the operation of the timing circuits of the repeaters would not be adequately checked. Therefore, the transmission of a series of pulse trains is required instead of the single pulses described with reference to Figs. 1 and 2.

It may be found that a pulse train of as many as one hundred is required to effect proper repeater operation. A train of one hundred pulses at the normal repetition rate of the transmitted intelligence of the order of $1.5 \times 10^6$ pulses per second would take approximately 70 microseconds to transmit. But 70 microseconds exceeds the round-trip delay time to the first repeater of about sixteen microseconds by a good margin. With this situation prevailing a returned signal would be received before transmission of the full pulse train had been completed. Therefore, a delay network 25 is included in by-pass network 20 of Fig. 4 to forestall any overlapping of transmitted and received pulses.

This delay network, which may be a conventional multisection L–C network of the type well known in the radar art, may provide a delay of the order of 100 microseconds at the first by-pass locations; 300 microseconds, at the second by-pass; 500 microseconds, at the third by-pass and 100 times $(2n-1)$ microseconds at the $n$th by-pass ($n$ being the order of the repeater station counting from the test terminal). Thus, the first returned pulses would be delayed 116 microseconds from the start of the transmitted pulse train, and returned pulse trains from succeeding repeaters would follow at delay interval of approximately 100 microseconds plus the normal line delay, and no interference between transmitted and returned pulses would then be experienced. A gap of about 100 microseconds between returned pulse trains is thus provided.

It is also appropriate to point out that as pulses are transmitted at the normal repetition rate, line distortion results in degradation of the pulses to such an extent that a certain amount of overlapping occurs as disclosed in the cited Wrathall patent. To improve the reliability of the operation of the test method described herein, it may be found that better results are obtained by transmitting the test pulses at half the repetition rate normally employed, that is at a 750,000 pulse-per-second-rate.

It is thus seen that, while pulse generator 11 may be a commercial pulse generator producing short pulses of say 0.8 microsecond length continuously, a gating means is required so that a sufficient time elapses between transmission of each successive series of pulses. A series of pulses, say ten or more in a group, is recommended especially where regenerative repeaters are employed so that an unambiguous oscilloscope pattern will result.

Gate generator 12, which may be another commercial pulse generator capable of producing a long pulse of appropriate duration with steep leading and trailing edges at a 100 pulse per second repetition rate, is used to control pulse generator 11 to allow the latter to produce groups of pulses. Gate generator 12 may preferably have a second output timed with the leading edge of the gate pulse for synchronizing the sweep circuit of oscilloscope 13 with the transmission of pulses from pulse generator 11.

Oscilloscope 13 is shown schematically only, but it should be understood that a commercial model is intended including necessary horizontal and vertical amplifiers and a self-contained sweep circuit which may be triggered by the gate pulse from gate generator 12.

In line A of Fig. 5 are shown the successive gate pulses G1 and G2 on the same time base as the oscilloscope pattern shown in line C of Fig. 5. Line B of Fig. 5 shows the transmitted pulses and line C of Fig. 5 illustrates the oscilloscope pattern. Each of P1 and P2 in line C represents the transmitted pulse train and R1, R2, and R$n$ show pulses returned from successive repeater stations.

Where it is found necessary to transmit a train of pulses over a time interval longer than the normal transmission delay time, as previously discussed, it is understood that the delay between transmitted group P1 and the first returned group R1 will be longer than the scale of line C shows. It is further to be understood that the number of pulses shown in the transmitted train in line B is arbitrary, and may be as few as one for nonrepeatered and linear repeatered lines and as many as one hundred where regenerative repeaters are employed.

The testing arrangement described above and shown in Figs. 3 and 4 will show the location of the faulty repeater by the absence or mutilation of returned pulses from that repeater station and those beyond. Knowledge of transmission delay time between repeater stations is assumed. Partial failure of a repeater station may also be analyzed from observation of the state of degradation of the pulses returned from a particular repeater station, if not absent entirely. Where observation of the pulses returnd from a particular repeater station is desired, principally where mutilated pulses are observed, it is convenient to employ an oscilloscope having a delayed expanded sweep feature. This feature permits the start of the sweep voltage to be delayed for some preset time after the synchronizing signal is applied in order that intermediate sections of the return signal may be analyzed in closer detail. Experience in operation of the system will bring an appreciation of the value of the described testing arrangement in that regard.

While the present invention has been described with relation to a particular embodiment, it will be obvious to one skilled in the art that the invention with appropriate modification is readily adaptable to other transmission systems or apparatus without departing from either the spirit or the scope of the invention.

What is claimed is:

1. In a two-way signaling transmission system including a terminal station and first and second pairs of conductors for opposite directions of transmission therewith, a plurality of discrete asymmetrically conducting means bridged across said first and second pairs of conductors at a plurality of spaced points therealong, said means being poled for conduction from one of said conductor pairs to the other conductor pair, and means comprising a source of adjustable unidirectional voltage connected to both said conductor pairs at said terminal station for remotely controlling forward and reverse biases on said asymmetrically conducting means to establish either a high or low resistance condition therein.

2. The transmission system in accordance with claim 1 which includes at said terminal station means for applying a pulse signal to said first pair of conductors, and means for sensing the pulses returned through said asymmetrically conducting means and said second pair of conductors.

3. The transmission system in accordance with claim 2 in which said pulse signal comprises a series of pulses shorter in duration than the transmission time between successive spaced points.

4. The transmission system in accordance with claim 1 in which said discrete asymmetrically conducting means at each of said spaced points comprises two asymmetrically conducting devices, said voltage means being adjustable in one sense to apply a reverse bias to said devices to establish said high resistance condition therein during normal signaling transmission on both said conductor pairs, said voltage means being further adjustable in another sense to apply a forward bias to said devices to establish said low resistance condition therein in the absence of normal signaling transmission on both said conductor pairs.

5. The transmission system in accordance with claim 4 which includes an attenuator network connected in series with said two asymmetrically conducting devices at each of said spaced points for augmenting the effective resistance of said low resistance condition thereof.

6. In combination, a first and second pair of conductors normally defining independent adjacent transmission paths, means for controllably interconnecting said pairs of conductors at spaced points comprising asymmetrically conducting means connected between said pairs of conductors at said spaced points, means for normally biasing said asymmetrically conducting means in a high resistance condition, and controllable means for biasing said asymmetrically conducting means in a low resistance condition.

7. In a cable carrier system having a pair of terminal stations and a plurality of intermediate repeater stations for relaying intelligence in both directions between said terminal stations, each repeater station including a separate amplifier for each direction of transmission, at each repeater station a by-pass circuit comprising a pair of diodes connected between the output conductors of one of said amplifiers and the input conductors of the other of said amplifiers, said diodes being poled for easy conduction from said output conductors to said input conductors, and means at one of said terminal stations for selectively biasing said diodes in either their high or low resistance condition.

8. The system in accordance with claim 7 and an attenuator network in series with each pair of said diodes.

9. The system in accordance with claim 7 and a time delay network in series with each pair of said diodes.

10. In apparatus for locating faulty repeater stations in a signaling transmission system having a pair of wires for each of two opposite directions of transmission, means for impressing a series of sharp pulses on one of said pairs of wires at one terminal of said system, means at each repeater station for by-passing said pulses through said repeater stations and back to said terminal over the other pair of wires, means included in said by-pass means for attenuating said by-passed pulses, means connected to said other pair of wires at said terminal for receiving said by-passed pulses, a cathode ray tube having means for producing an electron beam, sweep circuit means operative to control said beam and to indicate a time measurement, and connecting means from said receiving means to said means controlling said beam for producing a pattern on said cathode ray tube representative of said by-passed pulses.

11. The apparatus in accordance with claim 10 which includes means for delaying the start of said sweep circuit with respect to the transmission of a series of pulses for observing an intermediate group of said received pulses.

12. The apparatus in accordance with claim 10 in which said repeater stations include regenerative amplifiers having a shock-excited timing circuit and the duration of said series of impressed pulses exceeds the transmission delay time of said transmission system, and which includes means in said by-pass means for delaying said by-passed pulses at each of said repeater stations for a period longer than the duration of said impressed pulse series.

13. In a system for locating faulty repeaters on a four-wire electrical transmission line having a pair of wires for relaying intelligence in each of two opposite directions along said line, means for producing a series of sharp pulses, a cathode ray oscilloscope adapted to produce an electron beam made visible on a screen, sweep circuit means connected to said tube for controlling the travel of the beam across said tube in a known time, a gate circuit for producing a flat-topped wave, means connecting said gate circuit to said pulse-producing means and to said oscilloscope for triggering said pulse-producing means and said sweep circuit by the leading edge of said flat-topped wave, means stopping said pulse-producing means coincident with the trailing edge of said flat-topped gate wave, means applying said series of pulses to one of said pairs of wires at a terminal of said line, means at each repeater station for by-passing said pulses through each repeater station, means at said terminal for receiving said by-passed pulses, and means for applying said received pulses to said oscilloscope to form a pattern on the screen thereof.

14. In a four-wire transmission system having a pair of terminal stations and a plurality of intermediate repeater stations for relaying intelligence in both directions between said terminal stations, an arrangement for locating faulty repeater stations from one terminal thereof comprising at one of said terminal stations means for remotely closing a conducting path between oppositely directed amplifiers at each repeater station, means for impressing a series of periodic peaked pulses on a pair of wires conducting away from said terminal station, means connected to the other pair of wires at said terminal station for receiving the series of pulses returned from each of said repeater stations by way of said conducting paths, and means for comparing the transmitted pulses with said returned pulses.

15. In a four-wire electric cable for transmitting intelligence in opposite directions between the terminals thereof, said cable having a conductor pair for each of two opposite directions of transmission therethrough and a plurality of spaced repeater stations, each including an amplifier for amplifying said pulses in each direction of transmission, apparatus for remotely locating faulty repeater stations from one terminal thereof, said apparatus comprising at each repeater station a pair of by-pass diodes conductor between the output conductors of one amplifier and the input conductors of the other amplifier, and at one terminal of said cable chosen for a test location pulse-producing means connectable to the conductor pair conducting away from said terminal for sending a series of pulse trains over said last-mentioned conductor pair, through said diodes at each of said repeater stations and thence back over the return conductor pair to said one cable terminal, cathode ray oscilloscope means connected to said last mentioned conductor pair for observing the pulses returning thereover and indicating a time measurement between outgoing and returning pulses, means synchronizing the sweep rate of said oscilloscope with the transmission rate of said pulse-producing means, and selectable direct-current potential means for supplying power to said repeater stations to bias said diodes at each repeater station into the conducting state for the duration of a test observation and into the nonconducting state for normal operation of said repeater stations.

16. In a four-wire electric cable for transmitting intelligence in each of two opposite directions between the terminals thereof, said cable having a conductor pair for each of the two opposite directions of transmission therethrough and a plurality of spaced repeater stations, each including an amplifier for amplifying pulses in each direction of transmission, apparatus for locating faulty repeater stations from one terminal thereof, comprising at each repeater station a pair of by-pass diodes connected between the output conductors of one amplifier and the input conductors of the other amplifier, means connected in series with said diodes for attenuating the signal transmitted through said diodes, and at one terminal of said cable chosen for a test location pulse-producing means connectable to the conductor pair conducting away from said terminal for sending a series of pulses over said last-mentioned conductor pair, through said diodes at each of said repeater stations, and thence back over the other of said conductor pairs returning to said terminal, cathode ray oscilloscope means connected to said last-mentioned conductor pair for observing the pulses returning thereover, said oscilloscope means having a sweep circuit controlling the beam of said oscilloscope as a known function of time, gate circuit means for producing a square-topped wave with sharp leading and trailing edges, connecting means between said gate circuit means and said pulse-producing means for causing said pulse-producing means to generate pulses for the duration of said square-topped wave, and means connecting said gate circuit means to said oscilloscope means for triggering said sweep circuit with the leading edge of said square-topped wave to synchronize the sweep rate of said oscilloscope with the transmission rate of said pulse-producing means, and selectable direct-current potential means at said one cable terminal for supplying power over said respective conductor pairs to said repeater stations for biasing said diodes at each repeater station into the forward conduction state for the duration of a test observation and into the reverse conduction state for normal operation of said repeater stations.

17. Apparatus for locating faulty repeaters in an electronic transmission system having first and second terminal stations, lines outgoing from and incoming to said terminal stations, and a plurality of intermediate repeater stations for relaying intelligence in both directions over said lines between said terminal stations, comprising means for activating a conductive path between oppositely directed repeaters at each of said repeater stations remotely from said first terminal station, means for transmitting a series of pulses at predetermined time intervals over the outgoing line from said first terminal station, through said conductive paths at said repeater stations and thence back over said incoming line, means for receiving pulses returned over said incoming line from each of said repeater stations at said first terminal station, and means for comparing at said first terminal station the time relationship and character of said returned pulses with said transmitted pulses.

References Cited in the file of this patent

UNITED STATES PATENTS 2,260,160    Benning et al.    Oct. 21, 1941

FOREIGN PATENTS 981,001    France    Jan. 10, 1951